US012730985B2

(12) United States Patent
Overby et al.

(10) Patent No.: US 12,730,985 B2
(45) Date of Patent: Sep. 8, 2026

(54) MACHINE TRANSLATION SYSTEMS UTILIZING CONTEXT DATA

(71) Applicant: Microsoft Technology Licensing, LLC, Redmond, WA (US)

(72) Inventors: North Jude Overby, Tacoma, WA (US); Nazifa Nawar Chowdhury, Seattle, WA (US); Franklin Munoz Garcia, Kirkland, WA (US); Vikas Raunak, Bellevue, WA (US); Vishal Chandulal Chowdhary, Sammamish, WA (US); Tyler Stratton, Redmond, WA (US); Jiarui Guo, Sammamish, WA (US); Alexander Joseph Neshyba, Portland, OR (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 31 days.

(21) Appl. No.: 18/786,368

(22) Filed: Jul. 26, 2024

(65) Prior Publication Data

US 2026/0030460 A1 Jan. 29, 2026

(51) Int. Cl.
*G06F 40/58* (2020.01)
*G06F 16/353* (2025.01)
*G06N 3/0895* (2023.01)

(52) U.S. Cl.
CPC ............ *G06F 40/58* (2020.01); *G06F 16/353* (2019.01); *G06N 3/0895* (2023.01)

(58) Field of Classification Search
None
See application file for complete search history.

(56) References Cited

U.S. PATENT DOCUMENTS 12,493,772 B1 * 12/2025 Cameron ................. G06N 3/04
2024/0202539 A1 * 6/2024 Poirier ................. G06F 16/338
(Continued)

FOREIGN PATENT DOCUMENTS

JP 2022180282 A 12/2022

OTHER PUBLICATIONS

Yamada, Masaru. "Optimizing machine translation through prompt engineering: An investigation into ChatGPT's customizability." arXiv preprint arXiv:2308.01391 (2023). (Year: 2023).*
(Continued)

*Primary Examiner* — Douglas Godbold
(74) *Attorney, Agent, or Firm* — Foley IP Law, PLLC

(57) ABSTRACT

A method for utilizing contextual data in generating machine translations. The method includes receiving a translation request including an initial prompt received via a user interface. The initial prompt includes a first language passage and a translation instruction. The initial prompt also includes a context data signal received via a context data source. The method further includes generating a context instruction based on the context data signal and generating a modified prompt including the initial prompt and the context instruction. The method further includes sending the modified prompt to a neural machine translation (NMT) model to process the modified prompt and receiving a second language translation passage as a response to the modified prompt. The second translation language passage being a second language translation of the first language passage translated according to the translation instruction and the context instruction.

20 Claims, 7 Drawing Sheets

(56) References Cited

U.S. PATENT DOCUMENTS

| | | | | |
|---|---|---|---|---|
| 2025/0238638 | A1* | 7/2025 | Ouyang | G06F 40/51 |
| 2025/0265442 | A1* | 8/2025 | Brown | G06F 40/40 |
| 2025/0285043 | A1* | 9/2025 | Beagle | G06F 40/40 |
| 2025/0307552 | A1* | 10/2025 | Ebrahimi | G06F 40/284 |
| 2025/0375710 | A1* | 12/2025 | Wang | A63F 13/67 |
| 2025/0384400 | A1* | 12/2025 | Chakravarthula | G06Q 10/101 |

OTHER PUBLICATIONS

Anastasopoulos, et al., "Findings of The IWSLT 2022 Evaluation Campaign", In Proceedings of the 19th International Conference on Spoken Language Translation, 2022, pp. 98-158.

Wei, et al., "Finetuned Language Models Are Zero-Shot Learners", ICLR Conference, 2022, 46 pages.

Extended European Search Report Received in European Patent Application No. 25191937.9, mailed on Dec. 3, 2025, 08 pages.

* cited by examiner

MACHINE TRANSLATION SYSTEMS UTILIZING CONTEXT DATA

BACKGROUND

Machine translation (MT) systems are used to translate information taken from different modalities—such as images, audio, videos, text, and other data types—from one natural language to another. Traditional MT systems translate solely based on the provided prompt. That is, MT systems are provided with a passage for translation from one language to a desired translation language, and the MT systems provide a translation solely based on the word or words identified in the provided passage. When the provided passage includes words, phrases, or sentence that are specific to a certain context, the MT system will often fail to recognize the specific context, and thus provide an inaccurate translation given the context. Additionally, because traditional MT systems provided translations solely based on the contents of the provided passage, translations provided by the MT systems can often be vague and lack any personalized details related to the user.

SUMMARY

The disclosed examples are described in detail below with reference to the accompanying drawing figures listed below. The following summary is provided to illustrate some examples disclosed herein.

Example solutions include architectures and associated methods for using contextual data in creating context-appropriate machine translations. The architectures are configured for receiving a translation request including an initial prompt received via a user interface. The initial prompt includes a first language passage and a translation instruction. The initial prompt also includes a context data signal received via a context data source. The architectures are further configured for generating a context instruction based on the context data signal and generating a modified prompt including the initial prompt and the context instruction. The architectures are further configured for sending the modified prompt to a neural machine translation (NMT) model to process the modified prompt and receiving a second language translation passage as a response to the modified prompt. The second translation language passage being a second language translation of the first language passage translated according to the translation instruction and the context instruction.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
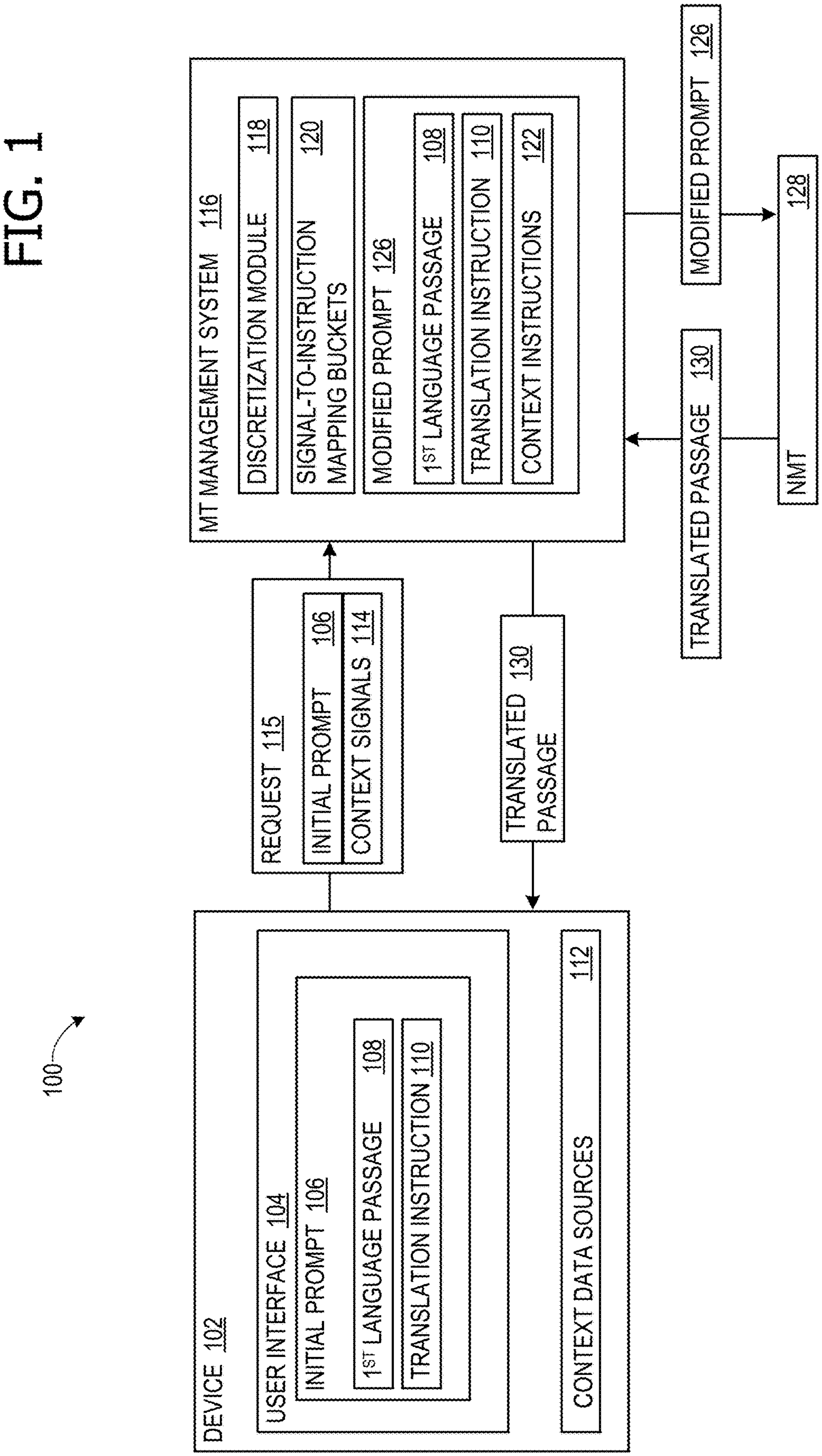
FIG. 1 illustrates an architecture for utilizing contextual data in generating a machine translation (MT)

Machine translation (MT) systems are used to translate information taken from different modalities—such as images, audio, videos, text, and other data types—from one natural language to another. Traditional MT systems work solely based on a provided prompt. That is, the MT systems are provided with a passage for translation from one language to a desired translation language, and the MT systems provide a translation solely based on the word or words identified in the provided passage. When the provided passage includes words, phrases, or sentence that are specific to a certain context, the MT system will often fail to recognize the specific context, and thus provide an inaccurate translation given the context. Additionally, because traditional MT systems provided translations solely based on the contents of the provided passage, translations provided by the MT systems can often be vague and lack any personalized details related to the user.

MT systems are commonly used in various settings. For example, MT systems can be used to provide audio or text-based translation of audio or video media, such as for closed captioning, for example. MT systems are also frequently employed on portable electronic devices and used by foreign travelers or those unfamiliar with a local language. In situations such as these, the user of the MT system is reliant on the MT system to communicate with others and, most importantly, wants to ensure the message they are trying to communicate to someone else is accurately communicated. Furthermore, the user wants to ensure their message is appropriate given the context of the conversation.

As a simple example, consider an English-speaking traveler attending a baseball game in Mexico where the local language is Spanish. After an out-of-the-park homerun, the traveler may wish to utilize an MT system to ask her Spanish-speaking companion "Wow! What kind of bat is that?", referring to the baseball bat used by the batter to hit the homerun. However, in Spanish, there are numerous words to describe the English word "bat"; such as "murciélago" used for the animal bat and "bate" used for a baseball bat. Traditional MT systems only operate based on the passage provided for translation, so, in this scenario, the MT system may translate the passage using "murciélago" rather than the appropriate "bate", and thus provide not only a contextually inappropriate translation, but a completely inaccurate translation of what the traveler was wanting to ask.

As will be discussed in greater detail below, exemplary architectures disclosed herein allow contextual data to be utilized in performing a machine translation to generate context appropriate and accurate translations. Architectures herein gather context data from various sources, such as, for example, sensing devices of the electronic device used in forming the initial prompt for requesting translation, such as location, visual, audio, spatial, motion, or environmental sensors, for example. Additionally, contextual data can be gathered related to the date and time, current events, a user's digital calendar, and a user's profile data, for example. The contextual data is mapped to specific context instruction for delivering to a neural machine translation (NMT) model. From there, a modified prompt, which includes the desired passage for translation, the translation instruction, and contextual instructions, is delivered to the NMT model for generating a translated passage as a response to the modified prompt.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example architecture 100 that advantageously enables translation services while utilizing contextual data. Architecture 100 includes an electronic device 102 with a user interface (UI) 104 that receives initial prompt 106. Initial prompt 106 includes a first language passage 108 that is input via the user interface 104 for which translation is desired. As will be discussed in greater detail below, the first language passage 108 can be provided according to any of a number of different modality types, such as, for example, input text, audio or voice input, a video file, an image, or any other suitable data type that the user desires to be translated. Initial prompt 106 further includes a translation instruction 110 that provides instruction on how to translate first language passage 108. For example, translation instruction 110 can comprise instructions for translating first language passage 108 to a second language. Device 102 further comprises a plurality of context data sources 112 used to acquire or detect data related to the context in which initial prompt 106 is being made. As will be discussed in greater detail below, context data sources 112 can include sensors, monitors, applications, storage, and other resources local to device 102, and can also include data from devices or systems remotely coupled with device 102, such as through internet, Bluetooth, or other remote network connections described herein. From context data sources 112, context signals 114 are formed, where the context signals 114 correspond with the certain contexts in which initial prompt 106 is being made. User interface 104 sends a translation request 115, which includes initial prompt 106 and context signals 114, to a machine translation (MT) management system 116, which maps context signals 114 to appropriate context instructions to modify and finetune initial prompt 106 for machine translation that takes into account the context in which initial prompt 106 is being made.

MT management system 116 includes a discretization module 118 configured to convert the device contextual data included in context data signals 114 into a discrete format for processing by a neural machine translation model (NMT) 128. Context signals 114 can comprise diverse signal types from various context data sources 112, and discretization module 118 converts the data into a discrete format so that the data can be categorized. Specifically, the discrete data from discretization module 118 are mapped to an appropriate instruction bucket via signal-to-instruction mapping bucket 120. As will be discussed in greater detail below, data context signals can be mapped to buckets that relate to instructions for the NMT 128. As a brief illustrative example, one context signal 114 may be the time in which initial prompt 106 was made, and may be 8:00 AM. Thus, in this example, discretization module 118 may identify the signal as corresponding to "morning" discretized signal 119 and map the discrete signal 119 to a "time" bucket 120. Singal-to-instruction mapping buckets 120 create context instructions 122 for providing to the NMT 128, each instruction 122 corresponding to a signal processed by the bucket generating the instruction. So, in the previously established example, the "time" bucket 120 would produce a "morning instruction" 122 ultimately from the "8:00 AM" signal 114.

MT management system 116 then creates a modified prompt 126, which includes first language passage 108 and translation instruction 110 from initial prompt 106, and further includes context instructions 122 generated by signal-to-instruction mapping buckets 120. MT management system 116 sends modified prompt 126 to NMT 128 for processing and receives from NMT 128 a response to modified prompt 126 in the form of a translated passage 130. NMT 128 translates first language passage 108 to the second language specified in translation instruction 110 and according to context instructions 122. MT management system 116 provides translated passage 130 to UI 104 for providing to the user. Various components of architecture 100 are implemented by a processor or multiple processors of one or multiple computing devices. MT management system 116, discretization module 118, signal-to-instruction mapping buckets 120, and NMT 128, for example, are executable by one or more processors disclosed herein based on instructions stored to one or multiple memories disclosed herein. As those with skill in the art will understand, neural translations models, such as NMT 128, use an artificial intelligence neural network to generate translated passages, and in some examples can include large language models (LLMs).

Figure 2:
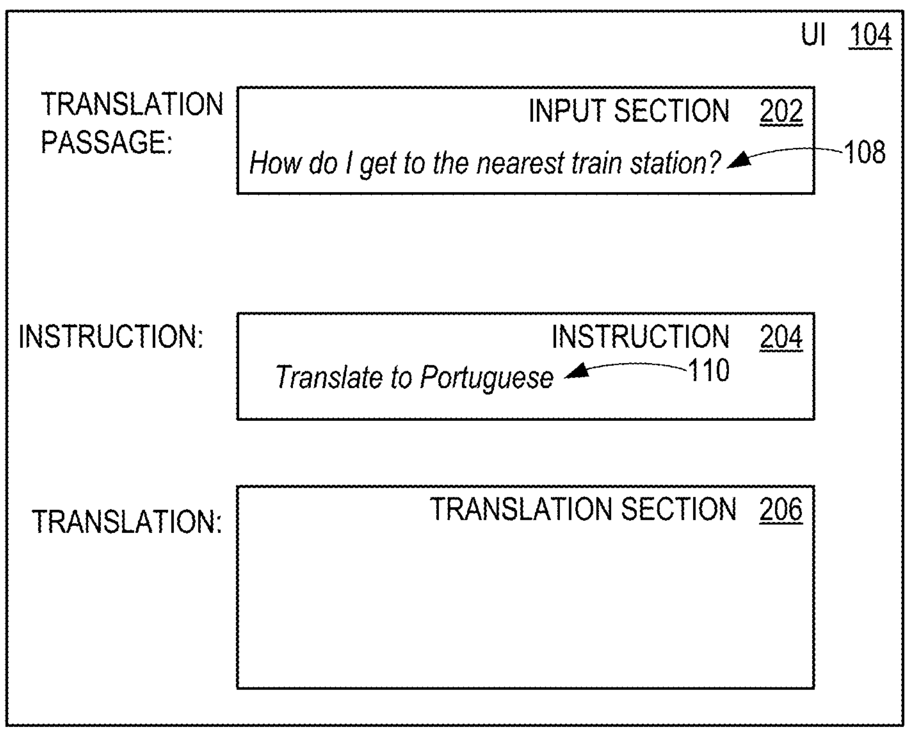
FIG. 2 illustrates an exemplary user interface (UI) employed by the examples of the architecture of FIG. 1.

FIG. 2 illustrates an example of UI 104, according to an example of this disclosure. As shown, UI 104 includes a display of a computing device, such as device 102, able to receive input, such as user input. UI 104 has a translation passage input section 202 where the user identifies the first language passage 108 to be included in initial prompt 106. In some examples, UI 104 allows for the user to input text as the first language passage 108. In some examples, the user enters first language passage via an audio input of device 102 such as a microphone so that the user can provide first language passage 108 by speaking. Those with skill in the art will recognize various other examples fall within the scope of this disclosure. In some examples, the user can import a media file that includes the first language passage 108 to input section 202, such as an image, audio, or video file, for example. In some examples, a URL link to storage hosting the first language passage 108 can be provided to input section 202. As illustrated, first language passage 108 can be described as a spoken or a natural language and is a language used for written or verbal communication.

UI 104 further optionally includes a translation instruction section 204 in which the user specifies translations instructions 110 for translating the first language passage 108 to a desired second language. As shown, in some embodiments, the user can specify translation instruction 110 via a text input. However, other examples fall within the scope of this disclosure, such as, for example, entering the translation instruction 110 verbally by speaking into a microphone, as has been discussed above. Although input section 202 and instruction 204 are shown as two different sections, according to various examples, first language passage 108 and translation instruction 110 can be received via UI 104 together or in a same section. According to various examples, a user simply types or speaks first language passage 108 and translation instruction 110 into UI 104 together. For example, and keeping with the example depicted in FIG. 2, the user may type or speak "Translate 'How do I get to the nearest train station?' to Portugues." Additionally, UI 104 includes a response section 206 where a response to initial prompt 106 in the form of translated passage 130 is provided to the user after the initial prompt 106 and associated contextual data signals 114 has been processed, as will be discussed in greater detail below. Translated passage 130 is a translation of first language passage 108 to a second language defined in translation instruction 110 and translated relevant to the contexts in which initial prompt 106 was created. Although response section 206 is illustrated as section to display text of translation passage 130, various other examples fall within the scope of this disclosure. In some examples, in addition to or as an alternative to displaying the translation passage 130, UI 104 provides an audio version of translation passage via a speaker for the user to listen to.

Figure 3:
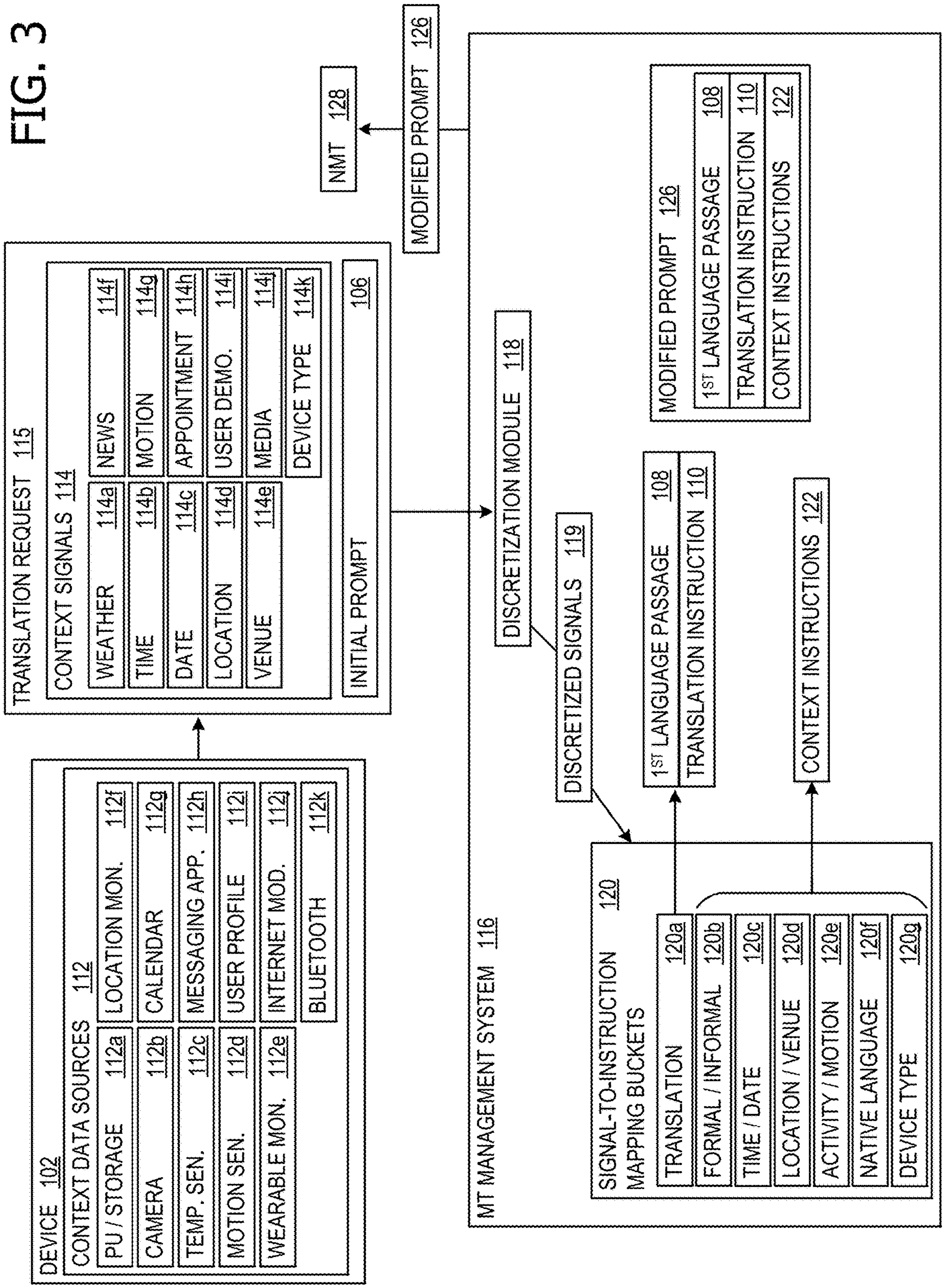
FIG. 3 is a diagram illustrating operations of an electronic device and an MT management system of the architecture of FIG. 1.

FIG. 3 is a diagram illustrating the generating and processing of translation request 115. As previously discussed, translation request 115 is generated by device 102 and delivered to MT management system 116. Translation request 115 includes initial prompt 106, which includes first language translation passage 108 and translation instructions 110, as well as context signals 114 corresponding to the contexts in which initial prompt 106 was created by the user. As mentioned, context signals 114 are generated from context data sources 112. As shown, there can be a plurality of different context data sources 112 either installed on or communicatively coupled with device 102.

The context data sources 112*a*-112*k* depicted are meant to illustrate an exemplary, non-exhaustive sample of possible data sources for creating data signals 114. For example, device 102 can include a processing unit and associated storage 112*a* which can comprise various data associated with the device (i.e., time, date, device type, etc.). Device 102 can further include a camera 112*b* or other sensing devices for gathering media data, such as for example, audio, video, or picture files. Device 102 can include a temperature sensor 112*c* for measuring data related to an ambient temperature. Device 102 can include a motion sensor, such as for example a gyroscope of accelerometer for gathering associated movements of device 102. Device 102 can include a wearable monitor 112*e* configured to be worn by the user for measuring a condition of the user, such as, for example, a heat rate monitor or a movement monitor. Device 102 can include a location monitor, such as a global positioning system (GPS) module for gathering location information related to the device 102. Device 102 can further include a calendar application 112*g* from which appointment data can be gathered. Calendar application 112*g* can be installed on device 102 or accessed via communication over a network such as via internet connection. Device 102 can include a messaging application 112*h* such as, for example, an email application, direct messaging application, or text message application. Messaging application 112*h* can be installed on device 102 or accessed via communication over a network such as via internet connection. Device 102 can include a user profile application 112*i* from which user demographic data can be gathered. User profile application 112*i* can be installed on device 102 or accessed via communication over a network such as via internet connection. Device 102 can also include communication modules, such as an internet module 112*j* and a Bluetooth module 112*k*. Internet module 112*j* can comprise associated hardware such as antennas for enabling cellular or Wi-Fi communication. Bluetooth module 112*k* can be any near-distance communication module enabling connection and communication with other compatible local devices.

Those with skill in the art will understand that the various context data sources 112*a*-112*k* can be either directly installed on device 102 or in wireless communication with device 102 for gathering data from the data source. For example, internet module 112*j* or Bluetooth module 112*k* can be used to communicate with other data sources for gathering data. As a simple example, wearable monitor 112*e* may be a heart rate monitor worn on the wrist of the user and which can transfer heart rate data via Bluetooth connection to device 102, which can be a mobile device of the user. Additionally, those with skill in the art will understand that depicted are just some of various data sources that could be used for creating context signals 114 and that various other context data sources fall within the scope of this disclosure.

Device 102 sends a translation request 115 to MT management system 116, which includes initial prompt 106 and context signals 114. The generation of initial prompt 106, including the first language passage 108 and translation instruction 110, on UI 104 was discussed in detail in FIG. 2. The context data signals 114*a*-114*j* depicted are meant to illustrate an exemplary, non-exhaustive sample of possible context data signals that can be generated from context data sources 112*a*-112*k*. For example, a weather data signal 114*a* related to the weather conditions at the time of the initial prompt 106 can be generated. Weather data signal 114*a* can be created based on data from various sensors, such as temperature sensor 112*c*, a weather application accessible by internet module 112*j*, or communication with a local device vie Bluetooth module 112*k*. A time signal 114*b* and a date signal 114*c* can be created relating to the time initial prompt 106 was entered, and can be created based on data from various data sources, such as processing unit 112*a* or communication with a local device via Bluetooth module 112*k*, for example. A location signal 114*d* and a venue signal 114*e* can be created relating to the location where initial prompt 106 was entered, and can be created based on data from various data sources, such as such as processing unit 112*a*, communication with a local device vie Bluetooth module 112*k*, location monitor 112*f*, or appointment data from calendar application 112*g*, for example. A news signal 114*f* can be created based on current events relating to location where the initial prompt 106 was entered, and can be created based on data from various data sources, such as such as communication with a local device via Bluetooth module 112*k* or via another wireless network via internet module 112*j*, for example. A motion signal 114*g* can be created based on movements from device 102 or the user when the initial prompt 106 was entered, and can be created based on data from various data sources, such as such as from motion sensor 112*d*, wearable monitor 112*e*, or location monitor 112*f*, for example. An appointment signal 114*h* can be created based on a user's scheduled appointment during which initial prompt 106 was entered, and can be created based on data from various data sources, such as such as communication from appointment data from calendar application 112*g*, for example. A user demographic signal 114*i* can be created based on initial prompt 106 the person demographics of the user entering the initial prompt 106 (such as, for example, age, native language, preferences, etc.) and can be created based on data from various data sources, such as user profile 112*i*, for example. A media signal 114*j* can be created based on the surroundings of the user while entering the initial prompt 106, and can be created based on data from various data sources, such as camera 112*b*, for example. A device type signal 114*k* can define the type of device 102 constitutes, and can be created based on data from various data sources, such as device processor/storage 112*a* or user profile application 112*i*, for example. Additionally, those with skill in the art will understand that depicted are just some of various context signals 114 that could be generated from context data sources 112 and that various other context data signals fall within the scope of this disclosure.

Translation request 115 is sent to MT management system 116 where it is processed by a discretization module 118. Translation request 115 may comprise a variety of data signals 114 of a number of different data types, and discretization module 118 is used to convert the numerous data types into a discrete data format and generate associated discretized signals 119. Specifically, the context signals 114 are used to generate discretized signals 119 so that the discrete signals 119 can be mapped to an appropriate signal-to-instruction mapping bucket 120. As those with skill in the art will understand, as opposed to continuous data (such as various examples of context signals 114 discussed herein) which can assume any numeric value and can be meaningfully split into smaller parts, discrete data (such as discretized signals 119) can only assume specific discrete values. Herein, as will be discussed in greater detail below, the discrete values take the form of discrete labels or categories associated with the context signal 114.

Discretized context signals 119 are mapped to appropriate signal-to-instruction buckets 120 based on the type of data contained in discrete signal 119. For example, translation information such as the initial prompt 106 including the first language passage 108 and the translation instruction 110 can be mapped to a translation bucket 120*a*. Signals related to the formality of the setting in which the initial prompt 106 is generated can be converted to discrete signals 119 and mapped to formal/informal bucket 120*b*. For example, data signals such as venue signal 114*e*, location signal 114*d*, appointment signal 114*h*, device type signal 114*k* and various other signals 114 may include data related to the formality of the setting in which the initial prompt 106 is created and can be converted to discrete signals 119 and mapped to formal/informal bucket 120*b*. Signals related to the time and date during which the initial prompt 106 is generated can be converted to discrete signals 119 and mapped to time/date bucket 120*c*. For example, data signals such as time signal 114*b*, date signal 114*c*, and various other signals 114 may include data related to the time and date which the initial prompt 106 is created and can be converted to discrete signals 119 and mapped to time/date bucket 120*c*. Signals related to the location or venue where the initial prompt 106 is generated can be converted to discrete signals 119 and mapped to location/venue bucket 120*d*. For example, data signals such as location signal 114*d*, venue signal 114*e*, appointment signal 114*h*, and various other signals 114 may include data related to the location or venue in which the initial prompt 106 is created and can be converted to discrete signals 119 and mapped to location/venue bucket 120*d*. Signals related to the activity or motion being performed by the user while creating the initial prompt 106 can be converted to discrete signals 119 and mapped to activity/motion bucket 120*e*. For example, data signals such as motion signal 114*g*, location signal 114*d*, and various other signals 114 may include data related to the motion or activity performed by the use when the initial prompt 106 is created and can be converted to discrete signals 119 and mapped to motion/activity bucket 120*e*. Signals related to the native language of the user creating the initial prompt 106 can be converted to discrete signals 119 and mapped to native language bucket 120*f*. For example, data signals such as user demographics signal 114*i* and various other signals 114 may include data related to the language spoken by the user and can be converted to discrete signals 119 and mapped to native language bucket 120*f*. Signals related to the device type on which the initial prompt 106 is created can be converted to discrete signals 119 and mapped to device bucket 120*g*. For example, data signals such as device type signal 114*k* and various other signals 114 may include data related to the type of device used to creates initial prompt 106 and can be converted to discrete signals 119 and mapped to native language bucket 120*f*. Additionally, those with skill in the art will understand that depicted are just some of various signal-to-instruction mapping buckets 120 used to generate context instructions 122 ultimately from context signals 114 and that various other bucket types fall within the scope of this disclosure.

According to various examples, discretization module 118 is trained by a human-machine loop where humans (system developers) use large language models, such as GPT-4 for example, to abstract the categories pertaining to the different data sources 112. For example, if the motion signal 114*g* is continuous, discretization module 118 converts motion signal 114*g* into a discrete binary values such as a 'moving' or 'static' discretized signal 119. Similarly, time signal 114*b* is converted into a 'morning', 'afternoon' or 'evening' discretized signal 119. Each of the continuous signals 114 is discretized in a manner such that the data is well-represented. That is, the most frequently appearing signals 114 are guaranteed to be allocated a specific category, whereas non-frequently appearing signals are bucketed into more 'generic' categories. The discretization module 118 is configured to convert continuous contextual data into discrete pieces of information which can ultimately be passed to NMT 128.

MT management system generates modified prompt using the instructions from the buckets 120. Specifically, first language passage 108 and translation instruction 110*a* are received from translation bucket 120*a* and included in modified prompt 126. Additionally, context instructions 122 from buckets 120*b*-120*g* are included in modified prompt 126. Each bucket 120*b*-120*g* can map the received discretized signal 119 to an associated instruction 122 for including in modified prompt 126, as will be discussed in greater detail in FIGS. 4-6. After the modified prompt 126 is generated, it is delivered to NMT 128 for processing. Thus, it can be said MT management system 116 is providing a "finetuned" prompt to NMT 128 since modified prompt 126 includes context instruction 122 that enables NMT 128 to better process modified prompt 126 and provide a context-appropriate response.

Figure 4:
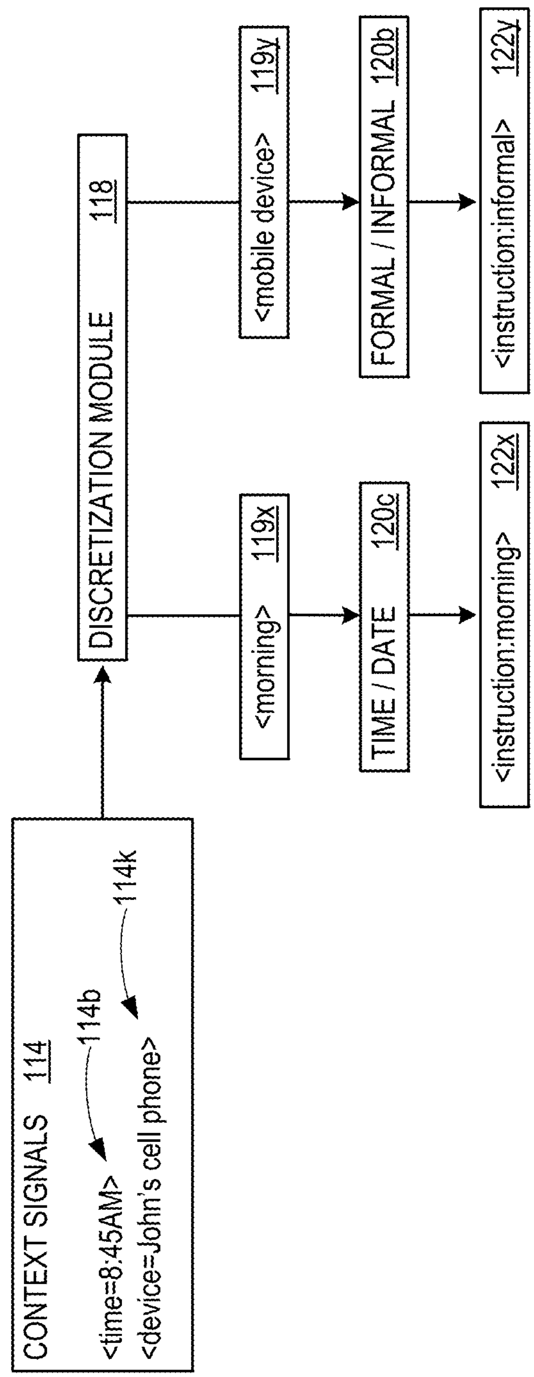
FIG. 4 is a diagram illustrating operations of a discretization module and signal-to-instruction mapping buckets of the architecture of FIG. 1.

FIG. 4 is a diagram showing an illustrative example of the processing performed by discretization module 118 and signal-to-instruction mapping buckets 120. Discretization module 118 is a custom classifier which, in some examples, is trained via human-in-the-loop training process. The training process leverages an LLM (such as GPT-4, for example) to create categories over which discrete labels are generated. As an illustrative example, based on a human-in-the-loop process using an LLM, three discrete categories are created for time: morning, afternoon, and evening. Discretization module 118 receives the continuous time signal 114*b* and converts it into one of three discrete categories to generate an associated discretized signal 119. Those three discrete categories then map to unique instructions 122 via times/date bucket 120*c* which the NMT 128 has been trained to understand. Discretization module 118 can include sets of classifiers (in some cases, the classifier is simply a rule: like in the time case, i.e. a rule-based classifier) and decision trees for generating discrete signals 119 from context signals 114.

FIG. 4 is an illustrative example showing discretization module 118 receiving a time signal 114*b* and device type signal 114*k*. As shown, the time signal 114*b* is continuous and in this instance shown as being 8:45 AM. Device type signal 114*k* shows what a user might have named their device, which in this example is "John's cell phone." From time signal 114*b*, discretization module 118 labels "8:45 AM" with a discrete label "morning" and thus creates discrete time signal 119*x* labeling the time signal 114*b* as morning. Similarly, from device type signal 114*k*, discretization module 118 labels "John's cell phone" with a discrete label "mobile device" and thus creates discrete device signal 119*y* labeling device signal 114*k* as a mobile device.

Discretization module 118 maps discrete signals 119 to appropriate buckets 120 for generating instructions 122. In some examples, there is a one-to-one mapping between discrete signals 119 and corresponding instructions 122. As shown, "morning" discrete signal 119*x* is mapped to time/date bucket 120*c*, and morning instruction 122*x* is generated. As shown "mobile device" signal 119*y* is mapped to formal/informal bucket 120*b* where informal instruction 122*y* is generated. As previously mentioned, signal-to-instruction mapping buckets 120, such as buckets 120*b*, 120*c* in the example, are configured to generate instructions 122*x*, 122*y* in a format that NMT 128 has been trained to understand. Signal-to-instruction mapping buckets 120 is a logic layer developed to generate instructions 122 from discrete signals 119, and in some examples includes one-to-one mapping between signals 119 and associated instructions 122. Those with skill in the art will recognize that FIG. 4 is an illustrative example for illustrating operations performed by discretization modules 118 and signal-to-instruction mapping buckets 120, and that various instructions 122 can be generated from the various type of context signals described herein using the operations described in FIG. 4.

Figure 5:
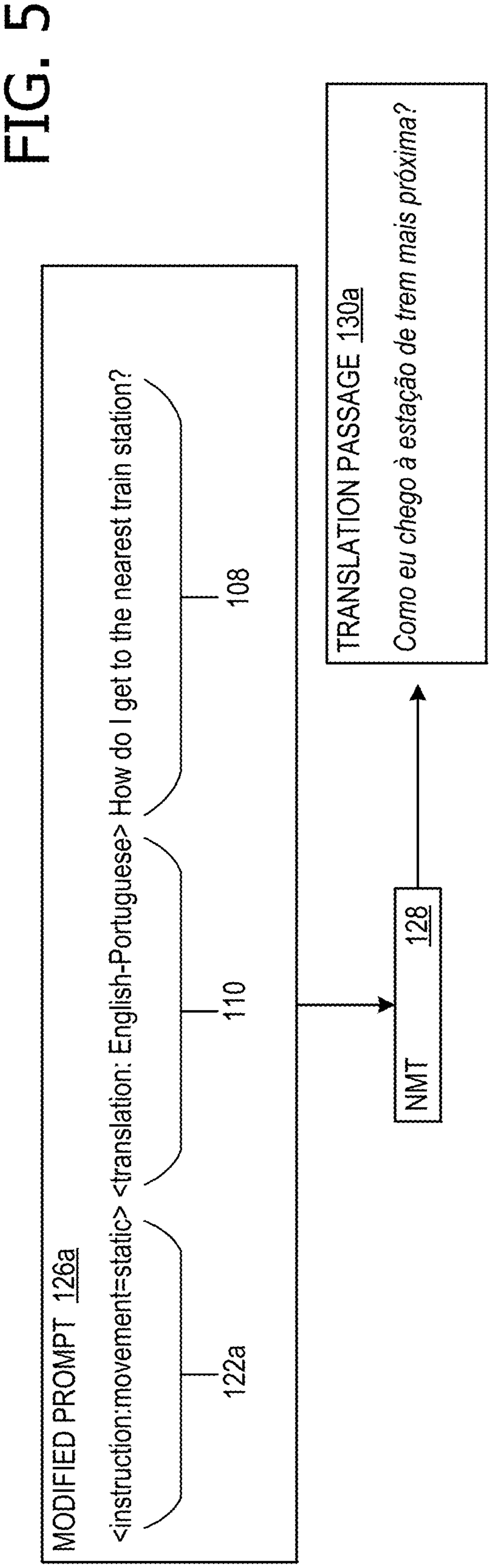
FIGS. 5-6 are diagrams illustrates exemplary MT models of the architecture of FIG. 1 generating translations of modified prompts that are modified to include contextual instructions.
Figure 6:
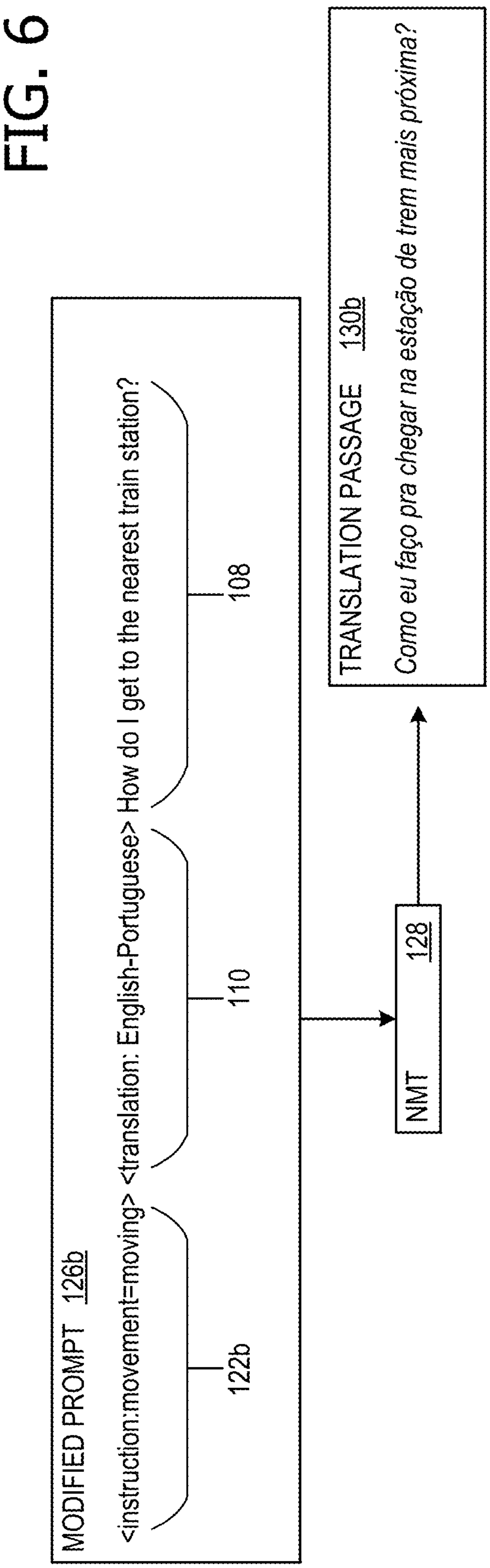

FIGS. 5 and 6 are exemplarily illustrations of how NMT 128 uses context instructions 122 in providing a translation passage 130. FIG. 5 illustrates an exemplary modified prompt 126*a*. As shown, the user has entered first language passage 108 of "How do I get to the nearest train" and in translation instruction 110 defines that the English first language passage is to be translated to Portuguese. Finally, modified prompt 126*a* includes finetuning in the form of instruction 122*a* related to the movement of the user while generating initial prompt 106. Instruction 122*a* is generated from activity/motion bucket 120*e*. As shown, instruction 122*a* instructs that the user was "static" when creating prompt 106. Activity/motion bucket 120*e* can be provided discrete signals 119 generated from motion context signals 114*g* which, as previously explained, can be generated by various data sources 112 of device 102. For example, a motion sensor 112*d* can generate motion signals 114*g*, and from those signals, activity/motion bucket 120*e* can ultimately map the signals to either a "static" instruction or a "moving" instruction. As shown modified prompt 126*b* of FIG. 6 is the same as prompt 126*a* except for instruction 122*b* which indicates a "moving" instruction.

When NMT 128 is given modified prompt 126*a* finetuned with the "static" instruction 122*a*, NMT 128 generates translation passage 130*a*, which is a translation of first language passage 108 from English to Portuguese, as per translation instruction 110, and according to "static" movement instruction 122*a*. Specifically, translation passage 130*a* reads "Como eu chego à estação de trem mais próxima?" When NMT 128 is given modified prompt 126*b* finetuned with the "moving" instruction 122*b*, NMT 128 generates translation passage 130*b*, which is a translation of first language passage 108 from English to Portuguese, as per translation instruction 110, and according to "moving" movement instruction 122*b*. Specifically, translation passage 130*b* reads "Como eu faço pra chegar na estação de trem mais próxima?" Notably, the use of"faço pra" in translation passage 130*b* implies an ongoing action, making translation passage 130*b* more conversational and appropriate for someone already moving in transit. Accordingly, translation passage 130*a* is a more contextually appropriate translation for someone in a static state, while translation passage 130*b* is a more contextually appropriate translation for someone already moving in transit. Although FIGS. 5 and 6 illustrate one context instruction 122*a*, 122*b* included in each modified prompt 126*a*, 126*b*, those with skill in the art will understand that multiple context instructions 122 can be included in a prompt in order to further finetune the prompt 126 and provide even more detail on the context in which initial prompt 106 is being made. For example, a modified prompt 126*c* substantially similar to modified prompt 126*b* could further include a timing context instruction 122*c* related to the time of day in which initial prompt 106 is being made, such as if the prompt made in the "evening". As such, the modified prompt 126*c* would include "<instruction: movement=moving, time=evening> <translation: English-Portuguese> How do I get to the nearest train station?".

Discretization module 118 can be said to format the context data signals 114, which are often continuous forms of data, to a discrete format as discretized signals 119 by identifying a category to which the context data signals 114 relate. As those with skill in the art will understand, as opposed to continuous data which can assume any numeric value and can be meaningfully split into smaller parts, discrete data can only assume specific discrete values. Herein, the discrete value being assigned to context signals 114 takes the form of a discrete category or label associated with the context signal 114. For example, in the "static" and "moving" example discussed in FIGS. 5-6, continuous motion data signals 114*g* identified as relating to movement are identified as belonging to a "moving" discrete category and thereby converted into an associated "moving" discrete signal 119, and thus a "moving" instruction 122*b* is generated from activity/motion bucket 120*e*. Similarly, continuous motion data signals 114*g* identified as relating to non-movement are identified as belonging to a "static" discrete category and thereby converted into an associated "static" discrete signal 119, and thus a "static" instruction 122*a* is generated from activity/motion bucket 120*e*. Those with skill in the art will understand that various other examples fall within the scope of this disclosure. For example, as discussed in FIG. 4, continuous time data signal 114*b* can be identified as belong to a "morning", "afternoon", or "evening" discrete category of time/date bucket 120*c*, and an appropriate "morning", "afternoon", or "evening" context instruction 122 can be generated accordingly. Device type signal 114*k* can be identified as corresponding to one of various discrete device categories, such as "mobile device", "laptop", "tablet", "watch", etc. and can be used to in generating formality context instruction. For example, device type signals 114 identified as a discrete "mobile device" signal 119 may be linked to an "informal" category of formal/informal bucket 120*b*, while device type signals identified as discrete "laptop" signal 119 may be linked to a formal category of formal/informal bucket 120*b*, and thus an "informal" context instruction 122 can be generated for the mobile device and a "formal" context instruction 122 can be generated for the laptop. Those with skill in the art will recognize these are just some of the various categories contemplated with the architectures disclosed herein.

Those with skill in the art will understand that FIGS. 5-6 are just examples of various possibilities possible with the architectures, such as architecture 100, disclosed herein. According to various examples, modified prompt 126 is finetuned with multiple instructions 122 from multiple signal-to-instruction mapping buckets 120. Thus, translation passage 130 can be generated by NMT 128 taking into account numerous contextual settings related to the contexts in which initial prompt 106 was made.

Figure 7:
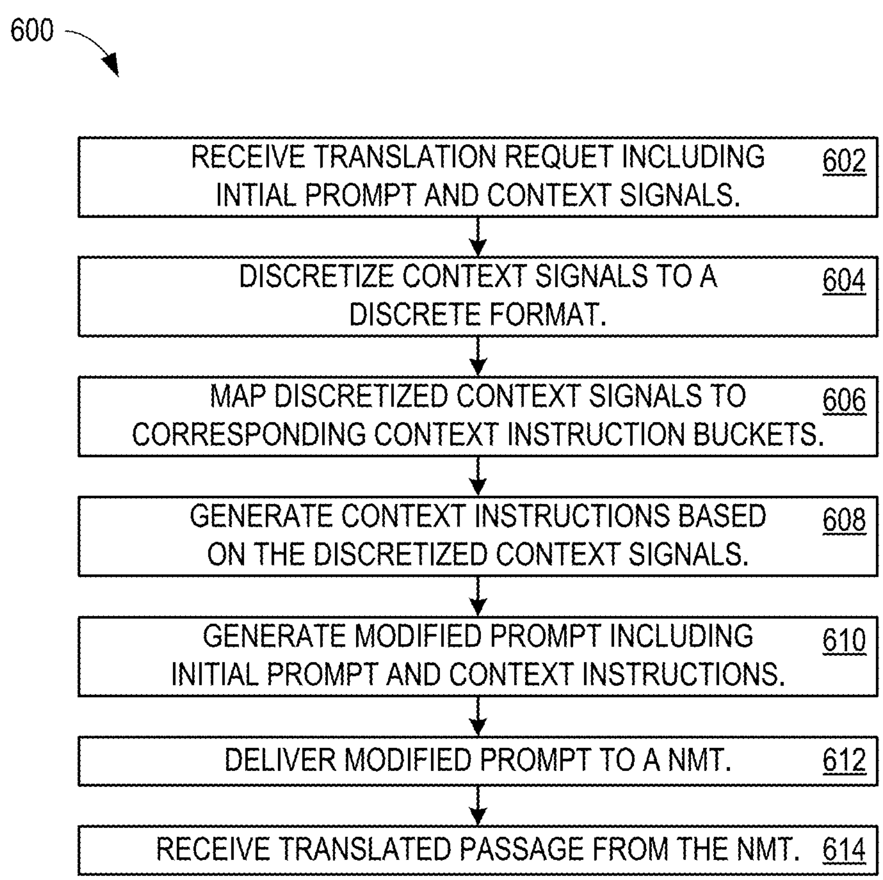
FIG. 7 is a flowchart illustrating exemplary operations that may be performed when using example architectures, such as the architecture of FIG. 1.

FIG. 7 is a flowchart illustrating a method 600 of utilizing contextual data in generating a finetuned machine translation. Method 600 can begin in block 602 by receiving a translation request, such as translation request 115. Translation request 115 includes an initial prompt 106 entered by a user via UI 104 which includes a first language passage 108 for translation and translation instruction 110 for translating the first language passage 108. Translation request further includes context signals 114 generated from any number of a plurality of context data sources 112. Method 600 can continue to block 604 by discretizing the signals 114 to a discrete format via discretization modules 118 to generate discrete signals 119. Method 600 can continue to block 606 by mapping the discretized context signals 119 to appropriate signal-to-instruction mapping buckets 120. Method 600 can continue to block 608 by generating context instructions 122 using signal-to-instruction mapping buckets 120. Method 600 can continue to block 610 by generating a modified prompt 126 which includes first language passage 108, translation instruction 110, and context instructions 122. Method 600 can continue to block 612 by delivering modified prompt 126 to NMT 128 for processing and translation. Method 600 can continue to block 614 by receiving translation passage 130 from NMT 128, translation passage being a translation of first language passage 108 to a second language specified in translation instruction 110 and taking into account context instructions 122. The translated passage 130 is then delivered to UI 104 for presenting or otherwise delivering to the user, such as by displaying translation passage in translation section 206 and/or by audibly providing translation passage via a speaker of device 120, for example.

Although method 600 is depicted as including blocks 602-614, those with skill in the art will recognize that, according to various examples, method 600 can include more or less blocks than those depicted. Additionally, although method 600 is depicted as performing blocks 602-614 according to a certain order, those with skill in the art will recognize that the blocks of method 600 can be performed according to various orders without departing from the scope of this disclosure.

Example Operating Environment

Figure 8:
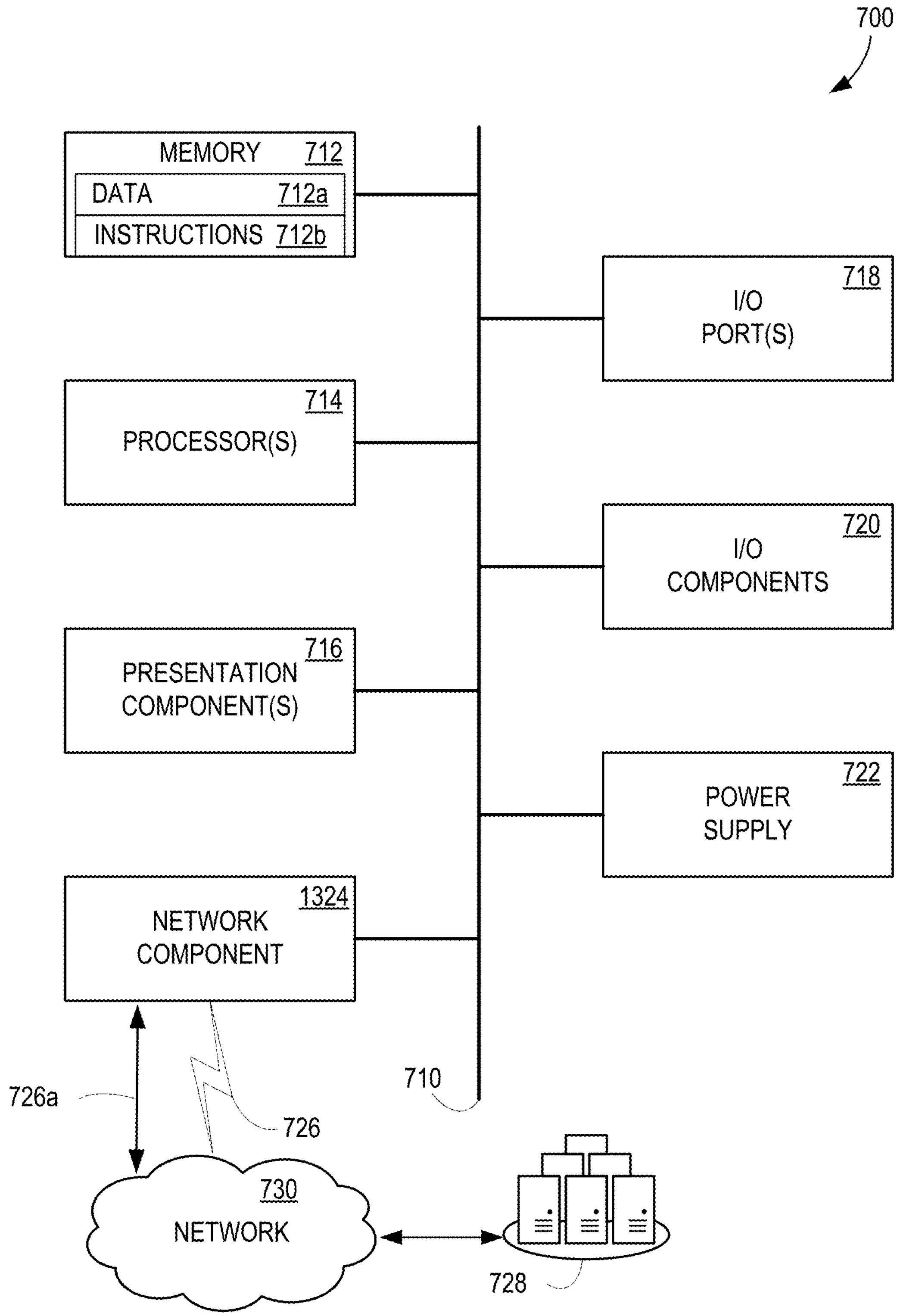
FIG. 8 illustrates a block diagram of an example computing device suitable for implementing some of the various examples disclosed herein.

FIG. 8 is a block diagram of an example computing device 700 (e.g., a computer storage device) for implementing aspects disclosed herein, and is designated generally as computing device 700. In some examples, one or more computing devices 700 are provided for an on-premises computing solution. In some examples, one or more computing devices 700 are provided as a cloud computing solution. In some examples, a combination of on-premises and cloud computing solutions are used. Computing device 700 is but one example of a suitable computing environment and is not intended to suggest any limitation as to the scope of use or functionality of the examples disclosed herein, whether used singly or as part of a larger set.

Neither should computing device 700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 700 includes a bus 710 that directly or indirectly couples the following devices: computer storage memory 712, one or more processors 714, one or more presentation components 716, input/output (I/O) ports 718, I/O components 720, a power supply 722, and a network component 1324. While computing device 700 is depicted as a seemingly single device, multiple computing devices 700 may work together and share the depicted device resources. For example, memory 712 may be distributed across multiple devices, and processor(s) 714 may be housed with different devices.

Bus 710 represents what may be one or more buses (such as an address bus, data bus, or a combination thereof). Although the various blocks of FIG. 8 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 8 and the references herein to a "computing device." Memory 712 may take the form of the computer storage media referenced below and operatively provide storage of computer-readable instructions, data structures, program modules and other data for the computing device 700. In some examples, memory 712 stores one or more of an operating system, a universal application platform, or other program modules and program data. Memory 712 is thus able to store and access data **712*a* and instructions 712*b* that are executable by processor 714 and configured to carry out the various operations disclosed herein. Thus, computing device 700 comprises a computer storage device having computer-executable instructions 712*b*** stored thereon.

In some examples, memory 712 includes computer storage media. Memory 712 may include any quantity of memory associated with or accessible by the computing device 700. Memory 712 may be internal to the computing device 700 (as shown in FIG. 10), external to the computing device 700 (not shown), or both (not shown). Additionally, or alternatively, the memory 712 may be distributed across multiple computing devices 700, for example, in a virtualized environment in which instruction processing is carried out on multiple computing devices 700. For the purposes of this disclosure, "computer storage media," "computer storage memory," "memory," and "memory devices" are synonymous terms for the memory 712, and none of these terms include carrier waves or propagating signaling.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing device 700, or by a processor external to the client computing device 700. In some examples, the processor(s) 714 are programmed to execute instructions such as those illustrated in the flow charts discussed below and depicted in the accompanying drawings. Moreover, in some examples, the processor(s) 714 represents an implementation of analog techniques to perform the operations described herein. For example, the operations may be performed by an analog client computing device 700 and/or a digital client computing device 700. Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways. I/O ports 718 allow computing device 700 to be logically coupled to other devices including I/O components 1020, some of which may be built in. Example I/O components 720 include, for example but without limitation, a microphone, joystick, game pad, satellite dish, scanner, printer, wireless device, etc.

Computing device 700 may operate in a networked environment via the network component 1324 using logical connections to one or more remote computers. In some examples, the network component 1324 includes a network interface card and/or computer-executable instructions (e.g., a driver) for operating the network interface card. Communication between the computing device 700 and other devices may occur using any protocol or mechanism over any wired or wireless connection. In some examples, network component 1324 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1324 communicates over wireless communication link 726 and/or a wired communication link **726*a* to a remote resource 728 (e.g., a cloud resource) across network 730. Various different examples of communication links 726 and 726*a*** include a wireless connection, a wired connection, and/or a dedicated link, and in some examples, at least a portion is routed through the internet.

Although described in connection with an example computing device 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system, comprising:
a processor; and
a memory including instructions executable by the processor to:
receive a translation request including:
an initial prompt received via a user interface and including a first language passage and a translation instruction defining a desired translation for the first language passage, and
a context data signal received via a context data source coupled to a device associated with the user interface and corresponding to a context of the initial prompt, wherein the context data source comprises a sensing device used to form the initial prompt, and wherein the context data signal comprises sensor output obtained at a time the initial prompt is received;
generate a context instruction based on the context data signal;
generate a modified prompt including the initial prompt and the context instruction that embeds the context instruction for a neural machine translation (NMT) model;
send the modified prompt to the NMT model to process the modified prompt; and
receive a second language translation passage as a response to the modified prompt, the second language translation passage being a second language translation of the first language passage translated according to the translation instruction and the context instruction.

2. The system of claim 1, further including instructions executable by the processor to:
receive a plurality of context data signals from a plurality of context data sources;
generate a plurality of context instructions from the plurality of context data signals; and
include the plurality of context instructions in the modified prompt.

3. The system of claim 1, wherein the context data source comprises a sensor or a monitor of the device.

4. The system of claim 1, further including instructions executable by the processor to:
discretize the context data signal to a discrete format;
map the discretized context data signal to a corresponding instruction bucket; and
generate the context instruction using the corresponding instruction bucket,
wherein the discretization of the context data signal to the discrete format is performed using a large language model (LLM).

5. The system of claim 4, wherein the discretization of the context data signal comprises identifying the context data signal as corresponding with one of a plurality of categories associated with the context data signal.

6. The system of claim 5, wherein the context instruction identifies a context category of a plurality of context categories to which the context data signal corresponds.

7. The system of claim 5, wherein:
the context data signal comprises the time of day in which the initial prompt was received via the user interface; and
the plurality of categories associated with the context data signal comprises: morning, afternoon, and evening.

8. A method for utilizing context data in performing machine translations, comprising:
receiving a translation request including:
an initial prompt received via a user interface and including a first language passage and a translation instruction defining a desired translation for the first language passage, and
a context data signal received via a context data source coupled to a device associated with the user interface and corresponding to a context of the initial prompt, wherein the context data source comprises a sensing device used to form the initial prompt, and wherein the context data signal comprises sensor output obtained at a time the initial prompt is received;
generating a context instruction based on the context data signal;
generating a modified prompt including the initial prompt and the context instruction that embeds the context instruction for a neural machine translation (NMT) model;
sending the modified prompt to the NMT model to process the modified prompt; and
receiving a second language translation passage as a response to the modified prompt, the second language translation passage being a second language translation of the first language passage translated according to the translation instruction and the context instruction.

9. The method of claim 8, further comprising:
receiving a plurality of context data signals from a plurality of context data sources;
generating a plurality of context instructions from the plurality of context data signals; and
including the plurality of context instructions in the modified prompt.

10. The method of claim 8, wherein the context data source comprises a sensor or a monitor of the device.

11. The method of claim 8, further comprising:
discretizing the context data signal to a discrete format;
mapping the discretized context data signal to a corresponding instruction bucket; and
generating the context instruction using the corresponding instruction bucket,
wherein the discretization of the context data signal to the discrete format is performed using a large language model (LLM).

12. The method of claim 11, wherein the discretization of the context data signal comprises identifying the context data signal as corresponding with one of a plurality of categories associated with the context data signal.

13. The method of claim 12, wherein the context instruction identifies a context category of a plurality of context categories to which the context data signal corresponds.

14. The method of claim 12, wherein:

the context data signal comprises the time of day in which the initial prompt was received via the user interface; and the plurality of categories associated with the context data signal comprises: morning, afternoon, and evening.

15. A computer storage medium storing instructions that are operative upon execution by a processor to:

receive a translation request including:

an initial prompt received via a user interface and including a first language passage and a translation instruction defining a desired translation for the first language passage, and a context data signal received via a context data source coupled to a device associated with the user interface and corresponding to a context of the initial prompt, wherein the context data source comprises a sensing device used to form the initial prompt, and wherein the context data signal comprises sensor output obtained at a time the initial prompt is received;

generate a context instruction based on the context data signal;

generate a modified prompt including the initial prompt and the context instruction that embeds the context instruction for a neural machine translation (NMT) model;

send the modified prompt to the NMT model to process the modified prompt; and receive a second language translation passage as a response to the modified prompt, the second language translation passage being a second language translation of the first language passage translated according to the translation instruction and the context instruction.

16. The computer storage medium of claim 15, further including instructions operative upon execution by the processor to:

receive a plurality of context data signals from a plurality of context data sources;

generate a plurality of context instructions from the plurality of context data signals; and include the plurality of context instructions in the modified prompt.

17. The computer storage medium of claim 15, wherein the context data source comprises a sensor or a monitor of the device.

18. The computer storage medium of claim 15, further including instructions operative upon execution by the processor to:

discretize the context data signal to a discrete format;

map the discretized context data signal to a corresponding instruction bucket; and generate the context instruction using the corresponding instruction bucket, wherein the discretization of the context data signal to the discrete format is performed using a large language model (LLM).

19. The computer storage medium of claim 18, wherein the discretization of the context data signal comprises identifying the context data signal as corresponding with one of a plurality of categories associated with the context data signal.

20. The computer storage medium of claim 19, wherein the context instruction identifies a context category of a plurality of context categories to which the context data signal corresponds.

* * * * *